United States Patent [19]

Bernal

[11] Patent Number: 4,491,601

[45] Date of Patent: Jan. 1, 1985

[54] METHOD OF MAKING A READILY PORTABLE BURRITO

[75] Inventor: Eddie L. Bernal, Defiance, Ohio

[73] Assignee: Taco Operations, Incorporated, Defiance, Ohio

[21] Appl. No.: 389,705

[22] Filed: Jun. 18, 1982

Related U.S. Application Data

[62] Division of Ser. No. 342,380, Jan. 25, 1982.

[51] Int. Cl.³ .................... A21D 13/00; A23L 1/00
[52] U.S. Cl. .............................. 426/421; 426/297; 426/439; 426/440
[58] Field of Search .................. 426/91, 92, 94, 134, 426/297, 138, 391, 283, 421, 110, 523, 439, 440; 99/450.1, 450.6

[56] References Cited

U.S. PATENT DOCUMENTS

| | | | |
|---|---|---|---|
| 1,778,485 | 10/1930 | Davidson | 426/134 |
| 2,060,490 | 11/1936 | Borbely | 426/94 |
| 2,589,823 | 3/1952 | Krens | 426/91 |
| 3,143,424 | 8/1964 | Wilson | 426/94 |
| 3,410,691 | 11/1968 | Stanley | 426/94 |
| 3,615,678 | 10/1971 | Tangel et al. | 426/297 |
| 3,656,968 | 4/1972 | Allen | 426/283 |
| 3,669,007 | 6/1972 | Pulici | 99/450.6 |
| 3,782,966 | 1/1974 | Forkner | 426/94 |
| 3,804,956 | 4/1974 | Bongiovanni | 426/134 |
| 3,904,772 | 9/1975 | Moegle | 426/92 |
| 4,084,493 | 4/1978 | Quintana | 99/450.6 |
| 4,139,644 | 2/1979 | Stephenson | 426/523 |
| 4,144,356 | 3/1979 | McDaniel | 426/91 |

FOREIGN PATENT DOCUMENTS

| | | | |
|---|---|---|---|
| 508065 | 12/1954 | Canada | 426/138 |
| 2383608 | 11/1978 | France | 426/94 |
| 786217 | 11/1957 | United Kingdom | 426/91 |

OTHER PUBLICATIONS

Time-Life Foods of the World, Cooking of China, Hahn 1968.
A Guide to the Selection, Combination & Cooking of Foods, vol. 2, Rietz et al. Avi Publ. 1965.

Primary Examiner—Steven L. Weinstein
Attorney, Agent, or Firm—Allen D. Gutchess, Jr.

[57] ABSTRACT

A highly portable Mexican-type food item is provided and more specifically a burrito-type product on a stick. Burritos consist essentially of a highly pliable, soft tortilla wrapped around a burrito food filler. The new burrito includes a self-sustaining tortilla with an edge portion thereof wrapped around a stick or other suitable elongate member which is grasped by the customer, with food filler being enclosed within the remaining portion of the tortilla and with the ends thereof turned in. The portability of the burrito product thus approaches that of an ice cream bar or a coated hot dog having a stick impaled in one end thereof, for example.

10 Claims, 9 Drawing Figures

METHOD OF MAKING A READILY PORTABLE BURRITO

This is a division of application Ser. No. 342,380 filed Jan. 25, 1982.

This invention relates to a portable food item and more particularly to a Mexican-type food item including a burrito mounted on an elongate member.

With increased popularity in Mexican food, burritos have kept an equal, if not a faster, pace. Burritos are made of a soft, highly pliable tortilla in a generally cylindrical shape which is wrapped around a burrito food filler. The filler usually includes seasoned meat or beans but, more recently, other food fillers have also been used, including such items as fruit. With the tortilla being soft and pliable, and the filler being squishy, if not juicy, of practical necessity, the burrito must be eaten on a plate. Consequently, burritos are usually sold by restaurants with dine-in facilities or purchased only by customers taken them home to eat.

The present invention provides a highly portable burrito product which can be carried about and eaten as easily as an ice cream bar or a coated hot dog impaled on a stick, commonly known as a corn dog, by way of example.

The portable Mexican-type food item includes a burrito-type product affixed to an elongate member or stick extending therefrom and intended to be grasped by the consumer during consumption of the product. The burrito-type product includes a tortilla wrapped on itself to form a chamber enclosing a food filler with the tortilla being in a semi-rigid, self-sustaining state so as to maintain a stiff, upright position when only a lower portion thereof is supported by the elongate member. The tortilla is affixed to the elongate member or stick with about half the length of the member projecting from an edge of the tortilla and with the stick enclosed in about half the length of the wrapped tortilla. The stick provides some lengthwise suport for the burrito product along with the self-sustaining nature of the tortilla, which is achieved through the cooking process employed.

In the making of the portable Mexican food item, a soft pliable tortilla, which commonly is made with white flour or cornmeal, is provided in a generally circular shape and laid flat on a suitable supporting surface. The elongate member or stick is then placed near a peripheral edge of the tortilla with about half the stick juxtapositioned thereon. The portion of the tortilla between the edge and the stick is then folded back over the stick with the edge laying beyond the stick. The stick and contiguous portions of the tortilla on each side thereof are then turned 180° over the edge portion of the tortilla previously extending beyond the stick and the turning step is then repeated to provide three layers of the tortilla on one side of the stick. A burrito food filler is then placed on the flat surface of the tortilla adjacent the wrapped portion and the stick and the peripheral edge of the tortilla opposite the edge originally adjacent the stick is then wrapped around the food filler and the first wrapped portion of the tortilla to provide a total of three layers on the other side of the stick and to form an open-ended, generally cylindrical chamber around the food filler. The edge of the tortilla preferably extends beyond the wrapped portion in an overlapping relationship with a portion of the tortilla adjacent the food filler. Edge portions of the tortilla adjacent the ends of the chamber are then turned in to form an enclosed chamber around the food filler.

The overlapped portion of the tortilla is then fastened to the inner portion by suitable means, such as a toothpick, which extends completely through the overlapped portions of the tortilla to hold it firmly in position. The resulting uncooked product is then placed in a hot liquid and cooked. The liquid can be a hot oil in which the uncooked product is immersed where it remains until it floats to the surface, indicating that it is done. The tortilla at this time has attained a self-sustaining state and it will remain substantially rigid even when held in an upright position by the exposed portion of the elongate member or stick. The fastener or toothpick is then removed and the product is ready for sale and consumption.

It is, therefore, a principal object of the invention to provide a highly portable Mexican food item and a method for making same.

Another object of this invention is to provide a burrito-type food product which can be carried about and eaten without the aid of a plate or other supporting surface.

Many other objects and advantages of the invention will be apparent from the following detailed description of a preferred embodiment thereof, reference being made to the accompanying drawing, in which.

Figure 1:
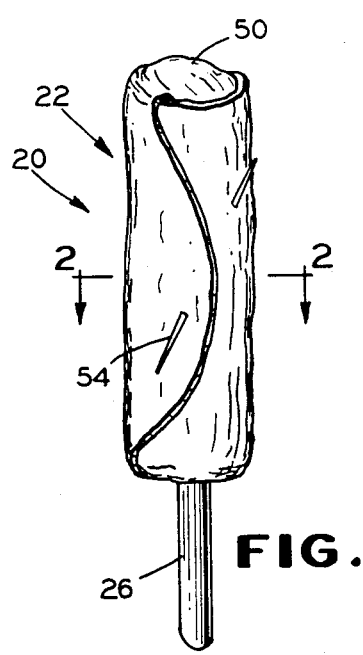
FIG. 1 is a view in perspective of a burrito-type food product in accordance with the invention.
Figure 2:
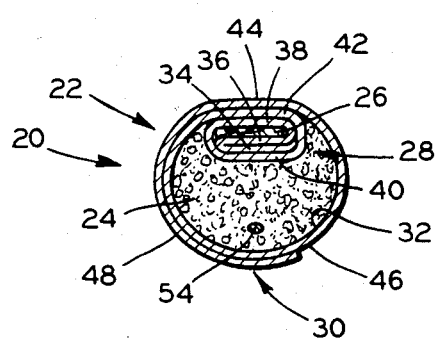
FIG. 2 is a view in transverse cross section taken along the line 2—2 of FIG. 1.

Referring to the drawings, and particularly to FIGS. 1 and 2, a burrito-type food product in accordance with the invention is indicated at 20. The burrito product basically includes a tortilla 22 with a food filler 24 and an elongate carrying member or stick 26 projecting downwardly. The tortilla 22 has a closely wrapped portion 28 around the stick 26 and an outer wrapped portion 30 spaced around the wrapped portion 28 and forming a generally cylindrical chamber 34 for the food filler 24.

The closely wrapped portion 28 of the tortilla 22 includes three layers on each side of the stick 26, the layers being designated 34, 38, 40, 42 and 44. These layers are supported by the inner portion of the stick 26, constituting about one-half of its length, with the layers forming a structural core extending beyond the end of the stick to the edge of the product, with the extended core approximately equaling the length of the portions of the layers wrapped around the stick 26.

Figure 9:
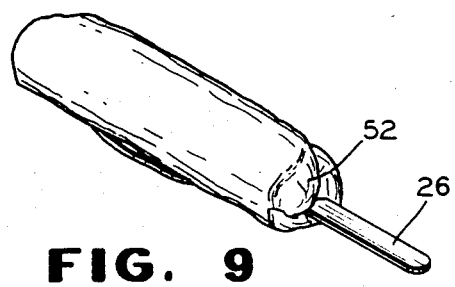

The outer wrapped portion 30 of the tortilla 22 includes an inner layer 46 extending from the layer 42 around the food filler 24 to the layer 44 and then beyond the layer 44 to an outer overlapping layer 48. An upper end 50 of the outer wrapped portion 30 of the tortilla is turned in to enclose one end of the chamber 32, as shown in FIG. 1. Somewhat similarly, a lower end 52 of the wrapped portion 30 of the tortilla is turned in, as shown in FIG. 9, to enclose the other end of the chamber 32. The food filler 24 is thus completely enclosed by portions of the tortilla 22 when the burrito product is being cooked and before it is eaten.

A temporary fastener 54, which can be in the form of a toothpick or the like, holds the tortilla 22 temporarily in place, until after it is cooked and achieves a self-sustaining state. The fastener 54 preferably extends through the layer 46, through the food filler 44, and through another portion of the layer 46 and the outer layer 48 of the tortilla, also being on a diagonal to hold longitudinally spaced portions of the tortilla layers 46 and 48 in place.

Figure 3:
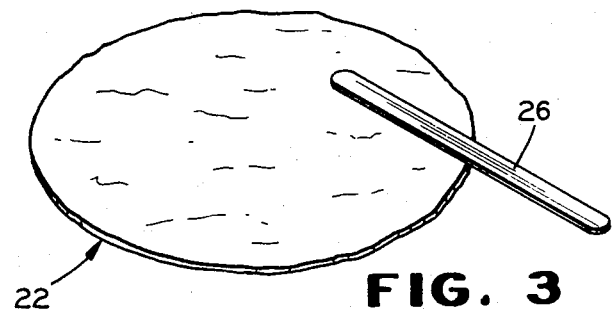
FIGS. 3–9 are somewhat schematic views in perspective showing the steps for making the burrito-type product in accordance with the invention.

In producing the food product, the generally-circular tortilla 22 is laid on a suitable flat surface and the elongate stick 26 is positioned thereon, as shown in FIG. 3. The stick is placed in a chordal position with about half of its length overlaying the tortilla and about half projecting beyond the peripheral edge thereof. The maximum distance of the stick from the tortilla edge in a radial direction is about one-fourth the diameter of the tortilla.

Figure 4:
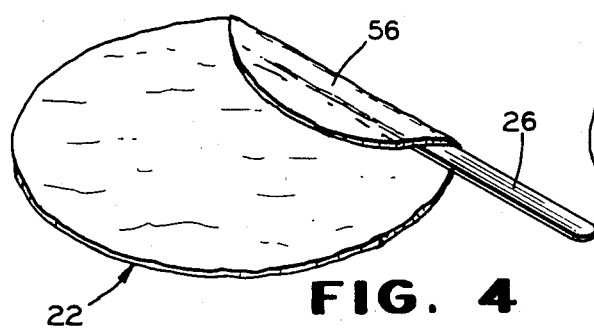

Next, an edge portion 56 of the tortilla at the side of the stick 26 is turned over (FIG. 4) the upper surface of the stick 26, which is noncircular, and preferably substantially rectangular in transverse cross section. This portion 56 is of sufficient size that it extends beyond the stick a distance approximating the width of the stick.

Figure 5:
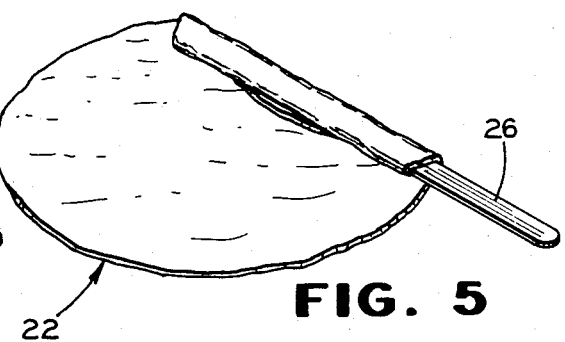

The stick is next turned 180° in a counterclockwise direction, as shown in FIG. 5. This causes the portion 56 to be doubled back and forms the layers 34 and 36 (FIG. 2) on the one side of the stick 26, along with the layer 38 on the other side of the stick.

Figure 6:
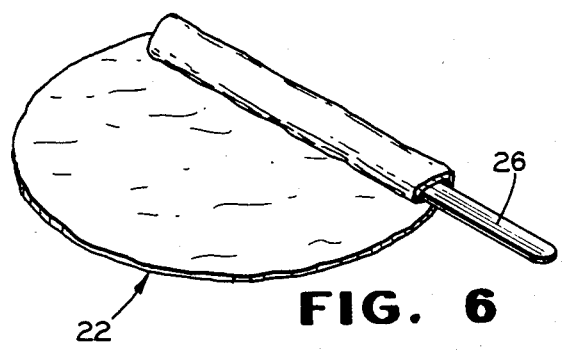

Referring to FIG. 6, the stick 26 is then turned another 180° in the counterclockwise direction to form the third layer 40 on the one side of the stick and the second layer 42 on the other side of the stick. The remaining flat portion of the tortilla 22 now constitutes about one-half to two-thirds of the overall area of the tortilla.

Figure 7:
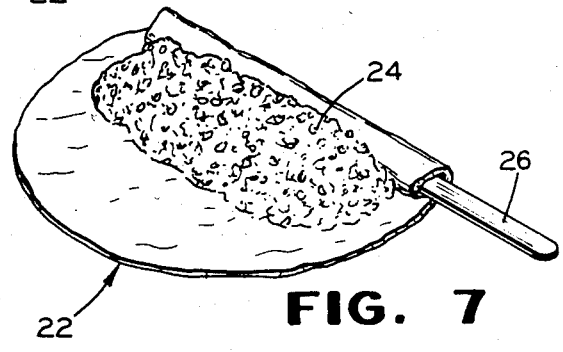
Figure 8:
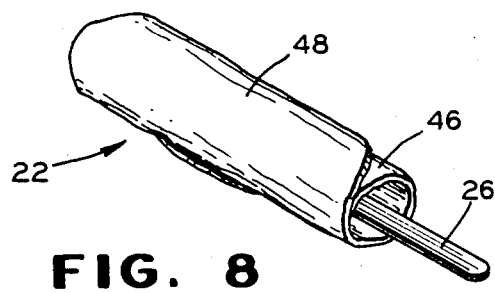

Referring to FIG. 7, a predetermined amount of the food filler 24 is deposited on the area contiguous with the wrapped portion around the stick. The food filler usually basically consists of seasoned meat or beans but widely divergent variations thereof, even including fruits, have been employed in burritos. In any instance, the food filler 24 characteristically is rather juicy or at least of squishy consistency.

The outer wrapped portion 30 of the tortilla 22 is then wrapped around the filler 24 and preferably beyond the portion of the tortilla wrapped around the stick to form the inner layer 46 of the wrapped portion 30, the third layer 44 (FIG. 2) of the wrapped portion 28, and the outer layer 48. Preferably, the layer 48 of the wrapped portion 30 extends substantially beyond the layer 44, in overlapping relationship with the inner layer 46, to provide greater structural integrity for the outer walls of the chamber 32.

The upper edge of the tortilla is then turned in to form the end wall 50 of FIG. 1 and the lower edge of the tortilla is similarly turned in to form the lower end wall 52 of FIG. 9, thereby closing off the ends of the chamber 32 to completely enclose the food filler 24. The temporary fastener 54 is then inserted through the tortilla product as described above.

At this point, the tortilla 22 still retains its highly pliable, soft state and would quickly fall apart if one attempted to lift it by the exposed portion of the stick 26. However, the product is then cooked in a manner to cause the tortilla 22 to obtain a semi-rigid, self-sustaining state. In that state, the tortilla is not as crisp as a cooked taco shell, for example, but is in an intermediate state of hardness between a cooked taco shell and the original, soft, pliable tortilla. It can be described as having a hardness similar to that of a crescent roll, for want of a better definition.

A preferred manner of achieving this state is by immersing the assembled item in hot liquid. A suitable container of hot cooking oil at a temperature from approximately 325° to 375° F. and preferably about 350° F. is employed. The burrito item is then immersed in the hot oil until it rises to the surface thereof, which indicates that it is done. The item is then removed from the oil and the fastener 54 extracted to achieve the final burrito-type product 20 ready for sale and consumption. The product can then be eaten from the upper end 50 down and the consumer can carry it about while doing so. During the cooking process, the tortilla swells slightly so that the wrapped portion 28 tightly engages the stick.

Various modifications of the above described embodiment of the invention will be apparent to those skilled in the art, and it is to be understood that such modifications can be made without departing from the scope of the invention, if they are within the spirit and the toner of the accompanying claims.

I claim:

1. A method of making a Mexican-type food item comprising providing a tortilla, laying the tortilla on a flat surface, positioning a substantially rigid and self-supporting elongate member on the tortilla with a substantial portion of its length projecting beyond an edge of the tortilla a sufficient distance to be hand held, with said elongate member located about one-fourth of the width of the tortilla from one edge thereof, folding inwardly and over and beyond the inner portion of the member positioned on the tortilla, the portion of the tortilla between said member and said one edge, then turning the member and the folded over tortilla portion inwardly toward an edge opposite said one edge over that portion of the tortilla extending beyond the member to secure the member to the tortilla, placing a food filler on the flat portion of the tortilla adjacent the member and the portion of the tortilla wrapped therearound, positioning the remaining flat portion of the tortilla around the food filler with the opposite edge in overlapping relationship with the wrapped portion, closing off end portions of the tortilla beyond the food filler to enclose the food filler, fastening said opposite edge to an underlying portion of the tortilla, and cooking the fastened tortilla in hot liquid by immersing it in the hot liquid to render the tortilla in a semi-rigid, self-sustaining state.

2. A method according to claim 1 wherein said hot liquid is oil at a temperature of 325°-375° F.

3. A method according to claim 1 characterized by cooking the fastened tortilla in said liquid until the tortilla rises to the surface of the liquid, and removing the tortilla from the liquid.

4. A method according to claim 1 characterized by turning the member again toward said opposite edge prior to placing the food filler on the flat portion of the tortilla.

5. A method of making a portable, Mexican-type food item comprising providing a soft, pliable tortilla of generally circular shape, laying the tortilla on a flat surface, positioning an elongate member on the tortilla with a substantial portion of its length projecting beyond an edge of the tortilla a sufficient distance to be hand held, with the elongate member located nearer one edge of the tortilla than an edge opposite the one edge, wrapping the portion of the tortilla between said member and the one edge around the member to secure the tortilla to the member, including turning the member inwardly away from the one edge toward the opposite edge, placing a food filler on an inner part of the flat portion of the tortilla adjacent the wrapped elongate member, positioning the remainder of the flat portion of the tortilla around the food filler with the opposite edge of the tortilla in overlapping relationship with the wrapped portion, closing off end portions of the tortilla beyond the food filler to enclose the food filler, and cooking the tortilla in hot liquid by immersing it in the hot liquid to cause the wrapped portion of the tortilla to swell and become affixed more fully to said elongate member and to cause said tortilla to reach a state of hardness between a cooked taco shell and the original soft, pliable tortilla.

6. A method of making a portable, Mexican-type food item according to claim 5 characterized by wrapping the tortilla around the elongate member by first folding inwardly and over and beyond the elongate member the portion of the tortilla between the member and the one tortilla edge, and turning the member inwardly toward the opposite edge of the tortilla and over the folded portion thereof extending beyond the member.

7. A method of making a portable, Mexican-type food item according to claim 6 characterized further by turning the member over toward the opposite edge of the tortilla another turn to cause at least two layers of the tortilla to be wrapped around said elongate member.

8. A method of making a portable, Mexican-type food item according to claim 5 characterized by fastening together the overlapped portions of the tortilla prior to immersing the tortilla in the hot liquid.

9. A method of making a portable, Mexican-type food item comprising providing a soft, pliable tortilla of generally circular shape, laying the tortilla on a surface, positioning an elongate member on the tortilla with a substantial portion of its length projecting beyond an edge of the tortilla a sufficient distance to be hand held and located asymmetrically on the tortilla with a larger portion of the tortilla on one side of the elongate member and a smaller portion of the tortilla on the opposite side of the elongate member, wrapping the smaller portion of the tortilla around the elongate member to secure the tortilla to the elongate member, placing a food filler on an inner part of the larger portion of the tortilla adjacent the wrapped elongate member, positioning the larger portion around the food filler and with an outer part thereof in overlapping relationship with the wrapped portion of the tortilla to circumferentially enclose the food filler, and cooking the tortilla in hot liquid by immersing it in hot liquid to cause the wrapped portion of the tortilla to swell and become secured more fully to the elongate member and to render the tortilla in a substantially self-sustaining state.

10. A method of making a portable, Mexican-type food item according to claim 9 characterized further by positioning said elongate member on the tortilla such that the wrapped portion of the tortilla extends substantially beyond an inner end of the elongate member.

* * * * *